US006815383B1

(12) United States Patent
Arnold

(10) Patent No.: US 6,815,383 B1
(45) Date of Patent: Nov. 9, 2004

(54) FILTRATION MEDIUM WITH ENHANCED PARTICLE HOLDING CHARACTERISTICS

(75) Inventor: Billy Dean Arnold, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/577,427

(22) Filed: May 24, 2000

(51) Int. Cl.$^7$ ................................................. D04H 3/00
(52) U.S. Cl. ...................... 442/362; 442/337; 442/341; 442/344; 442/415
(58) Field of Search ................................. 442/335, 337, 442/341, 344, 347, 415, 361–364; 428/373, 374

(56) References Cited

U.S. PATENT DOCUMENTS

| | | | |
|---|---|---|---|
| 3,092,892 A | * | 6/1963 | Ryan, Jr. et al. |
| 3,338,992 A | | 8/1967 | Kinney .......................... 264/24 |
| 3,341,394 A | | 9/1967 | Kinney .......................... 161/72 |
| 3,502,538 A | | 3/1970 | Petersen ...................... 161/150 |
| 3,502,763 A | | 3/1970 | Hartmann .................... 264/210 |
| 3,542,615 A | | 11/1970 | Dobo et al. .................. 156/181 |
| 3,692,618 A | | 9/1972 | Dorschner et al. ............ 161/72 |
| 3,802,817 A | | 4/1974 | Matsuki et al. ............... 425/66 |
| 3,849,241 A | | 11/1974 | Butin et al. .................. 161/169 |
| 3,917,448 A | | 11/1975 | Wood ............................. 8/125 |
| 3,998,988 A | | 12/1976 | Shimomai et al. .......... 428/400 |
| 4,068,036 A | | 1/1978 | Stanistreet .................. 428/296 |
| 4,088,726 A | | 5/1978 | Cumbers .................... 264/123 |
| 4,103,058 A | | 7/1978 | Humlicek .................... 428/171 |
| 4,170,680 A | | 10/1979 | Cumbers .................... 428/195 |
| 4,292,365 A | | 9/1981 | Kane et al. .................. 428/288 |
| RE30,955 E | | 6/1982 | Stanistreet ................ 156/308.2 |
| 4,340,563 A | | 7/1982 | Appel et al. ................ 264/518 |
| 4,493,868 A | | 1/1985 | Meitner ...................... 428/171 |
| 4,536,440 A | | 8/1985 | Berg .......................... 428/284 |

(List continued on next page.)

FOREIGN PATENT DOCUMENTS

| | | | |
|---|---|---|---|
| EP | 702 994 | 3/1996 | ........... B01D/39/16 |
| WO | 96/37291 | 11/1996 | ............ B01J/20/28 |
| WO | 97/13911 | 4/1997 | ............ D04H/1/74 |
| WO | 97/14495 | 4/1997 | ........... B01D/39/08 |
| WO | 97/18346 | 5/1997 | ............ D04H/1/54 |
| WO | 97/23267 | 7/1997 | ........... B01D/39/16 |
| WO | 97/37071 | 10/1997 | ............ D04H/3/14 |
| WO | 97/39817 | 10/1997 | ........... B01D/39/08 |
| WO | 97/44509 | 11/1997 | ............. D01F/1/10 |
| WO | 98/16672 | 4/1998 | ............. D01F/8/06 |
| WO | 98/49381 | 11/1998 | ............ D04H/1/00 |
| WO | 98/52672 | 11/1998 | ........... B01D/39/08 |
| WO | 98/53896 | 12/1998 | ........... B01D/39/08 |
| WO | 00/00267 | 1/2000 | ........... B01D/39/00 |
| WO | 00/28123 | 5/2000 | ............ D04H/3/16 |

OTHER PUBLICATIONS

Rodriguez, Ferdinand. Principles of Polymer Systems, Second Edition. Hemisphere Publishing Corporation, 1982. p 538–539.*

*Primary Examiner*—Cheryl A. Juska
*Assistant Examiner*—Jenna-Leigh Befumo
(74) *Attorney, Agent, or Firm*—Pauley Petersen & Erickson

(57) ABSTRACT

A nonwoven web useful as a filter medium includes a plurality of bicomponent multilobal fibers including a higher melting polymer component, a lower melting polymer component, and an interface between the polymer components. The fibers are bonded together at points of contact including the lower melting polymer components, to provide a coherent filter medium. The multilobal fibers include raised lobal regions and depressed regions between the lobes which catch, trap or ensnare particulate matter that is being filtered from a gaseous or liquid medium. The multilobal fibers may be electrecized to provide electrostatic attraction between the fibers and the particles.

19 Claims, 3 Drawing Sheets

U.S. PATENT DOCUMENTS

| | | | | |
|---|---|---|---|---|
| 4,547,420 A | 10/1985 | Krueger et al. | | 428/229 |
| 4,592,943 A | 6/1986 | Cancian et al. | | 428/171 |
| 4,666,763 A | 5/1987 | King et al. | | 428/221 |
| 4,707,399 A | 11/1987 | Rambosek | | 428/225 |
| 4,774,124 A | 9/1988 | Shimalla et al. | | 428/171 |
| 4,787,947 A | 11/1988 | Mays | | 156/160 |
| 4,824,623 A | 4/1989 | Rambosek | | 264/60 |
| 4,858,629 A | 8/1989 | Cundari | | 131/332 |
| 4,861,633 A | 8/1989 | Abe | | 428/36.3 |
| 4,908,052 A | 3/1990 | Largman et al. | | 55/486 |
| 4,988,560 A | 1/1991 | Meyer et al. | | 428/297 |
| 5,057,368 A | 10/1991 | Largman et al. | | 428/397 |
| 5,069,970 A | 12/1991 | Largman et al. | | 428/373 |
| 5,082,899 A | 1/1992 | Sawyer et al. | | 525/74 |
| 5,108,820 A | 4/1992 | Kaneko et al. | | 428/198 |
| 5,126,199 A | 6/1992 | Sawyer et al. | | 428/359 |
| 5,185,199 A | 2/1993 | Sawyer et al. | | 428/359 |
| 5,200,246 A | 4/1993 | Sabee | | 428/109 |
| 5,225,014 A | 7/1993 | Ogata et al. | | 156/73.2 |
| 5,232,770 A | 8/1993 | Joseph | | 428/284 |
| 5,246,474 A | 9/1993 | Greatorex | | 55/381 |
| 5,270,107 A | 12/1993 | Gessner | | 428/296 |
| 5,288,348 A | 2/1994 | Modrak | | 156/62.2 |
| 5,326,629 A | 7/1994 | Vaughn et al. | | 428/224 |
| 5,336,552 A | 8/1994 | Strack et al. | | 428/224 |
| 5,350,620 A | 9/1994 | Sundet et al. | | 428/172 |
| 5,382,400 A | 1/1995 | Pike et al. | | 264/168 |
| 5,401,446 A | 3/1995 | Tsai et al. | | 264/22 |
| 5,403,367 A | 4/1995 | De Villiers et al. | | 55/320 |
| 5,409,766 A | 4/1995 | Yuasa et al. | | 428/224 |
| 5,418,045 A | 5/1995 | Pike et al. | | 428/198 |
| 5,470,640 A | 11/1995 | Modrak | | 428/171 |
| 5,480,464 A | 1/1996 | De Villiers et al. | | 55/320 |
| 5,484,645 A | 1/1996 | Lickfield et al. | | 428/198 |
| 5,491,016 A | 2/1996 | Kaiser et al. | | 428/198 |
| 5,498,468 A | 3/1996 | Blaney | | 428/198 |
| 5,503,745 A | 4/1996 | Ogata et al. | | 210/490 |
| 5,534,339 A | 7/1996 | Stokes | | 428/284 |
| 5,540,979 A | 7/1996 | Yahiaoui et al. | | 428/212 |
| 5,573,841 A | 11/1996 | Adam et al. | | 428/219 |
| 5,580,459 A | 12/1996 | Powers et al. | | 210/634 |
| 5,597,645 A | * 1/1997 | Pike et al. | | 442/361 |
| 5,605,746 A | 2/1997 | Groeger et al. | | 442/347 |
| 5,607,735 A | 3/1997 | Brown | | 428/36.1 |
| 5,607,766 A | 3/1997 | Berger | | 428/373 |
| 5,622,772 A | 4/1997 | Stokes et al. | | 442/401 |
| 5,633,082 A | * 5/1997 | Berger | | 428/365 |
| 5,656,368 A | 8/1997 | Braun et al. | | 428/141 |
| 5,662,728 A | 9/1997 | Groeger | | 96/153 |
| 5,667,562 A | 9/1997 | Midkiff | | 96/15 |
| 5,672,415 A | 9/1997 | Sawyer et al. | | 428/219 |
| 5,707,468 A | 1/1998 | Arnold et al. | | 156/62.6 |
| 5,707,735 A | * 1/1998 | Midkiff et al. | | 428/373 |
| 5,709,735 A | 1/1998 | Midkiff et al. | | 96/17 |
| 5,718,972 A | 2/1998 | Murase et al. | | 428/360 |
| 5,721,180 A | 2/1998 | Pike et al. | | 442/346 |
| 5,726,107 A | 3/1998 | Dahringer et al. | | 442/414 |
| 5,728,299 A | 3/1998 | Tokudome et al. | | 210/497.01 |
| 5,733,825 A | 3/1998 | Martin et al. | | 442/361 |
| 5,753,330 A | 5/1998 | Terakawa et al. | | 428/36.3 |
| 5,783,503 A | 7/1998 | Gillespie et al. | | 442/340 |
| 5,785,725 A | 7/1998 | Cusick et al. | | 55/382 |
| 5,800,230 A | 9/1998 | Horiuchi et al. | | 442/352 |
| 5,804,295 A | 9/1998 | Braun et al. | | 428/323 |
| 5,811,045 A | 9/1998 | Pike | | 264/168 |
| 5,811,186 A | 9/1998 | Martin et al. | | 428/373 |
| 5,817,584 A | 10/1998 | Singer et al. | | 442/345 |
| 5,820,645 A | 10/1998 | Murphy, Jr. | | 55/385.3 |
| 5,855,784 A | 1/1999 | Pike et al. | | 210/505 |
| 5,873,968 A | 2/1999 | Pike et al. | | 156/73.2 |
| 5,895,710 A | 4/1999 | Sasse et al. | | 442/334 |
| 5,906,879 A | 5/1999 | Huntoon et al. | | 428/136 |
| 5,935,883 A | 8/1999 | Pike | | 442/340 |
| 5,989,004 A | 11/1999 | Cook | | 425/131.5 |
| 5,993,714 A | 11/1999 | Sawyer et al. | | 264/168 |
| 6,235,663 B1 | 5/2001 | Dahringer et al. | | 442/330 |
| 6,613,704 B1 | * 9/2003 | Arnold et al. | | 442/361 |

* cited by examiner

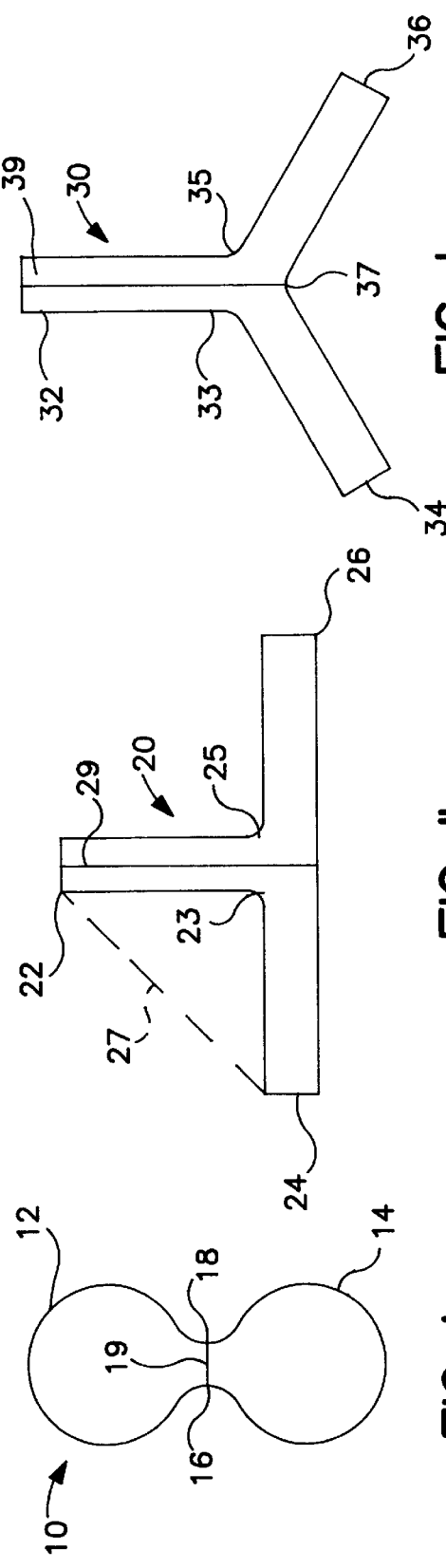
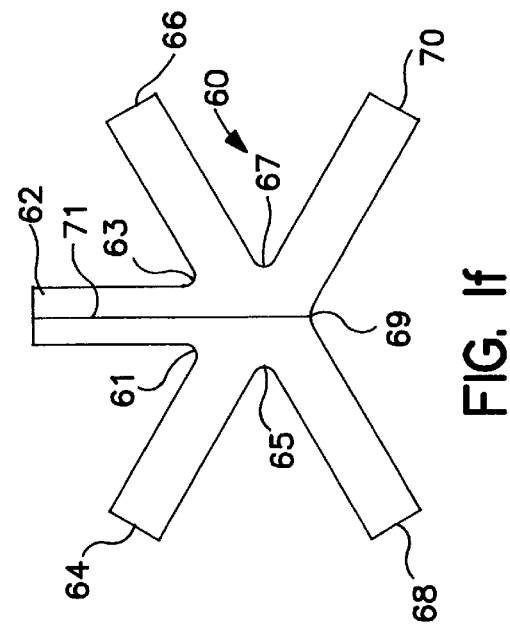
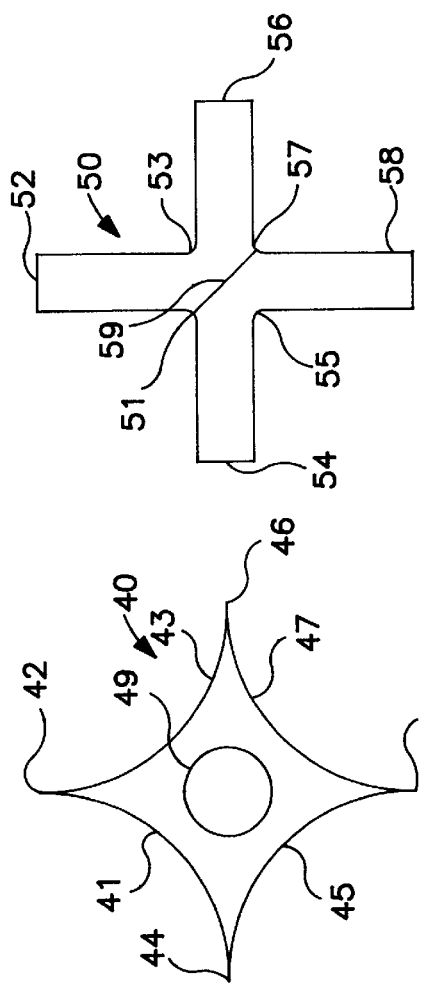
FIG. 1a  
FIG. 1b  
FIG. 1c  
FIG. 1d  
FIG. 1e  
FIG. 1f

FILTRATION MEDIUM WITH ENHANCED PARTICLE HOLDING CHARACTERISTICS

FIELD OF THE INVENTION

This invention relates to an improved filter medium containing fibers which are configured to hinder the passage of particles.

BACKGROUND OF THE INVENTION

Filter media having large interfiber pores and, thus, a high permeability typically contain sparsely packed relatively thick fibers. Such filter media require relatively low driving pressure to provide adequate filtration throughput rate and service life. However, highly permeable filter media, e.g., residential glass fiber HVAC filters, only provide a low filtration efficiency in that the large interfiber pore structures of the media do not have interstitial configurations that are suitable for entrapping fine contaminant particles. Consequently, coarse fiber, highly permeable, filter media have not been used in fine particle filtration applications.

In contrast, microfiber nonwoven webs, such as meltblown fiber webs, have been used as fine particle filter media. The densely packed fine fibers of these webs provide fine interfiber pore structures that are highly suitable for mechanically trapping or screening fine particles. However, the fine pore structure of meltblown fiber webs and other similar microfiber webs that have densely packed fine fibers results in a low permeability, creating a high pressure drop across the webs. Consequently, the low permeability of fine fiber filter media requires a high driving pressure to establish an adequate filtration throughput rate. Furthermore, as contaminants accumulate on the surface of the filter media, the contaminants quickly clog the small interfiber pores and further reduce the permeability of the media, thereby even further increasing the pressure drop across the media and rapidly shortening the service life.

Additionally, microfiber web filter media do not tend to have a physical integrity that is sufficient enough to be self-supporting. Although the physical integrity of microfiber filter media can be improved by increasing the basis weight or thickness of the web, the increased basis weight or thickness exacerbates the pressure drop across the filter media. As such, microfiber web filter media are typically laminated to a supporting layer or fitted in a rigid frame. However, the conventional supporting layer or rigid frame does not typically contribute to the filtration process and only increases the production cost of the filter media.

There remains a need for self-supporting filter media that provide combinations of desirable filter properties, including high filtration efficiency and particle retention, high permeability, low pressure drop, high throughput rate and long service life.

SUMMARY OF THE INVENTION

The present invention is directed to a lofted nonwoven filter medium which employs multilobal fibers to enhance the filtration efficiency and increase the particle holding characteristics of the web. Each of the multilobal fibers has a cross section defined by a plurality of raised portions separated by depressed portions. The multilobal fibers have the ability to catch, trap or ensnare particulate impurities in the depressed regions between the raised lobal regions, thereby effecting a high filtration efficiency without requiring the fibers to be small or closely packed together. The multilobal fibers can be used alone or in combination with fibers which are not multilobal, or which do not have depressed regions.

In one embodiment, the multilobal fibers are bicomponent, with a higher melting polymer portion and a lower melting polymer portion. The lower melting portion facilitates bonding of the fibers together, in conventional through-air and other bonding processes that can be used to form a coherent web filtration structure. The higher melting component helps maintain the multilobal structure of the fibers. The multilobal fibers can also be electret treated to facilitate attraction of dipolar particles.

With the foregoing in mind, it is a feature and advantage of the invention to provide an improved nonwoven web for filtration applications, which includes multilobal fibers having raised lobal portions and depressed portions.

It is also a feature and advantage of the invention to provide a filter medium including the improved nonwoven web.

BRIEF DESCRIPTION OF THE DRAWINGS

FIGS. 1(a)–1(f) illustrate cross-sectional shapes of several multilobal fibers suitable for the nonwoven web and filter medium of the invention.

DEFINITIONS

Figure 2A:
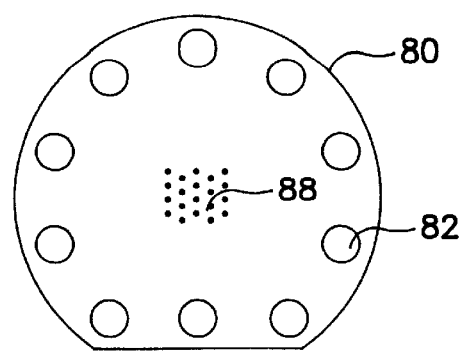
FIGS. 2(a)–2(c) illustrate an exemplary die apparatus for making pentalobal fibers suitable for the nonwoven web and filter medium of the invention.

The term "nonwoven fabric or web" means a web having a structure of individual fibers or threads which are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91.)

The term "microfibers" means small diameter fibers having an average diameter not greater than about 75 microns, for example, having an average diameter of from about 1 micron to about 50 microns, or more particularly, microfibers may have an average diameter of from about 1 micron to about 30 microns. Another frequently used expression of fiber diameter is denier, which is defined as grams per 9000 meters of a fiber. For a fiber having circular cross-section, denier may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex," which is defined as the grams per kilometer of fiber. Tex may be calculated as denier/9.

The term "spunbonded fibers" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average diameters larger than about 7 microns, more particularly, between about 10 and 30 microns.

The term "meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin. Meltblown fibers are microfibers which may be continuous or discontinuous, are generally smaller than 10 microns in diameter, and are generally self bonding when deposited onto a collecting surface. Meltblown fibers used in the present invention are preferably substantially continuous in length.

The term "monocomponent" fiber refers to a fiber formed from one or more extruders using only one polymer. This is not meant to exclude fibers formed from one polymer to which small amounts of additives have been added for color, anti-static properties, lubrication, hydrophilicity, etc. These additives, e.g., titanium dioxide for color, are generally present in an amount less than 5 weight percent and more typically about 2 weight percent.

The term "bicomponent filaments or fibers" refers to fibers which have been formed from at least two polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side-by-side arrangement or an "islands-in-the-sea" arrangement. Bicomponent fibers are taught in U.S. Pat. No. 5,108,820 to Kaneko et al., U.S. Pat. No. 5,336,552 to Strack et al., and U.S. Pat. No. 5,382,400 to Pike et al., U.S. Pat. No. 5,989,004 to Cook, each of which is incorporated herein in its entirety by reference. For two component fibers, the polymers may be present in ratios of 75/25, 50/50, 25/75 or any other desired ratios. Conventional additives, such as pigments and surfactants, may be incorporated into one or both polymer streams, or applied to the filament surfaces. The term also includes similar fibers or filaments having more than two components.

The term "polymer" includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

The terminology "electret treatment" or "electreting" refers to any process which places a charge in and/or on a dielectric material such as a polyolefin. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to electreting are well known by those skilled in the art. These methods include, for example, thermal, liquid-contact, electron beam and corona discharge methods. One exemplary process for placing a charge on a dielectric material involves the application of a DC corona discharge to the material. An exemplary conventional method of this type is described in detail in U.S. Pat. No. 5,401,446 to Tsai et al. entitled "Method and Apparatus for the Electrostatic Charging of a Web or Film" which issued on Mar. 28, 1995. The entirety of this patent is hereby incorporated herein by reference. This technique involves subjecting a material to a pair of electrical fields wherein the electrical fields have opposite polarities.

The term "through-air bonding" or "TAB" means a process of bonding a nonwoven bicomponent fiber web in which air which is sufficiently hot to melt one of the polymers of which the fibers of the web are made is forced through the web. The air velocity can be between 100 and 500 feet per minute and the dwell time may be as long as 6 seconds. The melting and resolidification of the polymer provides the bonding. Through-air bonding has relatively restricted variability and since through-air bonding (TAB) requires the melting of at least one component to accomplish bonding, it is restricted to webs with two components like conjugate fibers or those which include an adhesive. In the through-air bonder, air having a temperature above the melting temperature of one component and below the melting temperature of another component is directed from a surrounding hood, through the web, and into a perforated roller supporting the web. Alternatively, the through-air bonder may be a flat arrangement wherein the air is directed vertically downward onto the web. The operating conditions of the two configurations are similar, the primary difference being the geometry of the web during bonding. The hot air melts the lower melting polymer component and thereby forms bonds between the filaments to integrate the web.

DETAILED DESCRIPTION OF THE PRESENTLY PREFERRED EMBODIMENTS

Referring to FIG. 1(a), a bilobal bicomponent nonwoven fiber 10 is shown in cross-section. The fiber 10 has two lobes 12 and 14, and depressed regions 16 and 18 on both sides of fiber 10 between the lobes. A boundary line 19 indicates the interface between a higher melting polymer component forming one of the lobes 12 and 14, and a lower melting polymer component forming the other lobe. The higher and lower melting polymers are arranged side-by-side.

FIG. 1(b) illustrates, in cross-section, a trilobal bicomponent nonwoven fiber 20 in which the three lobes 22, 24 and 26 are positioned at right angles to each other. A depressed region 23 is located between the lobes 22 and 24. A depressed region 25 is located between the lobes 22 and 26. It should be apparent from FIG. 1(b), for instance, that the term "depressed region" refers to a region which is concave with respect to a straight line drawn tangential to the two adjacent lobes. In FIG. 1(b), a straight line 27 can be drawn tangential to adjacent lobes 22 and 24, with concave portion 23 underneath the straight line. A similar straight line can be drawn tangential to adjacent lobes 22 and 26. However, no concave region exists with respect to a straight line drawn tangential to adjacent lobes 24 and 26. In FIG. 1(b), the dividing line 29 represents an interface between a lower melting polymer component forming half of the fiber, and a higher melting polymer component forming the other half of the fiber. Again, the higher and lower melting polymers are arranged in a side-by-side configuration.

FIG. 1(c) illustrates, in cross-section, a trilobal bicomponent nonwoven fiber 30 in which the three lobes 32, 34 and 36 are positioned at 160-degree angles to each other. A depressed region 33 is located between lobes 32 and 34. A depressed region 35 is located between lobes 32 and 36. A depressed region 37 is located between lobes 34 and 36. A dividing line 39 represents an interface between a lower melting polymer form half of the fiber 30, and a higher melting polymer forming the other half. Again, the fiber 30 has a side-by-side distribution of higher and lower melting polymers.

FIG. 1(d) illustrates, in cross-section, a quadrilobal bicomponent fiber 40 in which the four lobes 42, 44, 46 and 48 are arranged in a star-like configuration. Depressed regions 41, 43, 45 and 47 are formed between each pair of adjacent lobes. A circular dividing line 49 represents an interface between a lower melting polymer component and a higher melting polymer component. In this instance, the bicomponent fiber has a sheath-core configuration with the higher melting polymer forming the core and the lower melting polymer forming the sheath.

FIG. 1(e) illustrates, in cross-section, a quadrilobal bicomponent fiber 50 in which the four lobes 52, 54, 56 and 58 are arranged in a cross configuration. Depressed regions 51, 53, 55 and 57 are formed between each pair of adjacent lobes. Dividing line 59 represents the interface between higher and lower melting polymers, which are arranged in a side-by-side configuration.

FIG. 1(f) illustrates, in cross-section, a pentalobal bicomponent fiber 60 having five lobes 62, 64, 66, 68 and 70 arranged at approximately 72-degree angles to each other. Depressed regions 61, 63, 65, 67 and 69 are formed between each pair of adjacent lobes. Dividing line 71 represents the interface between higher and lower melting polymers which are arranged in a side-by-side configuration.

Figure 4:
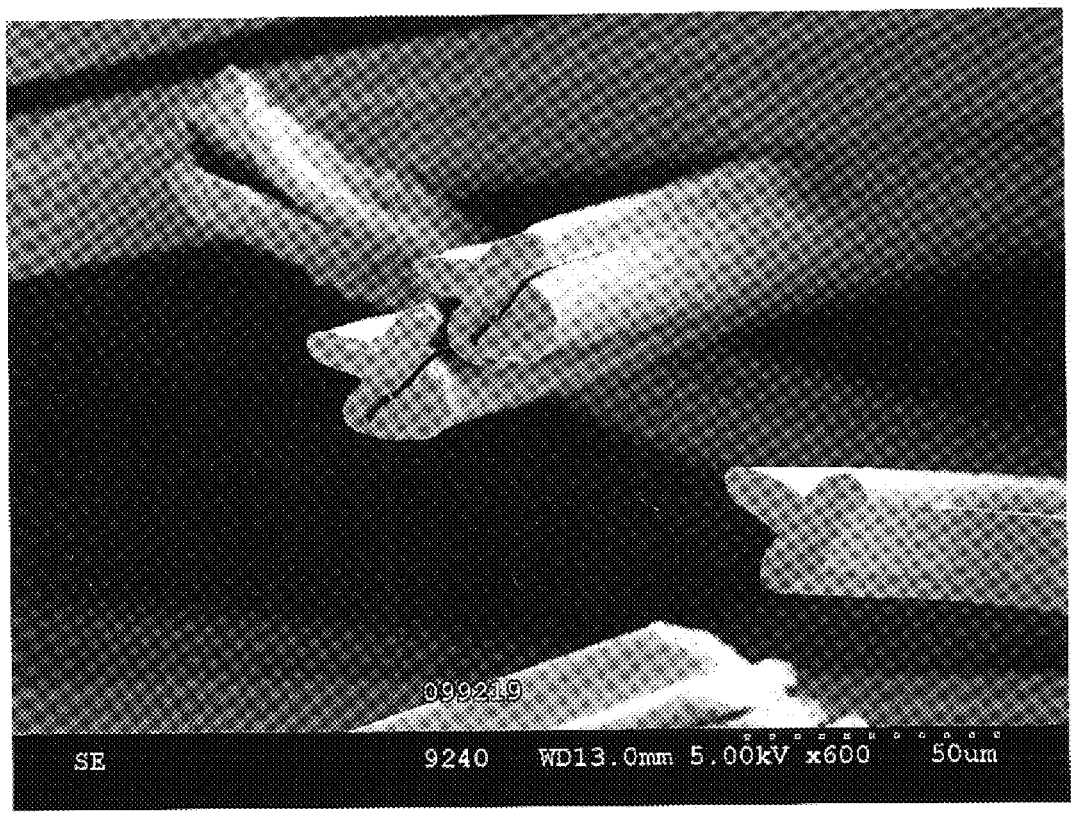
FIG. 4 is a scanning electron microscopy (SEM) photograph showing bow pentalobal fibers can be affected by a through-air bonding or similar heating process.

FIG. 4 illustrates how the multilobal bicomponent fibers can be affected by a through-air bonding process, or a similar heating process that may be used to bond the fibers in a web together at points of contact which include the lower melting polymer component. Prior to through-air bonding, the fibers in FIG. 4 had a pentalobal cross-section similar to that shown in FIG. 1(f). The fibers in FIG. 4 represent a side-by-side bicomponent extension of a polypropylene component and a linear low density polyethylene component. After through-air bonding at a temperature high enough to melt or soften the polyethylene but not the polypropylene, the fibers take on an asymmetrical configuration. Specifically, the lobes composed of polypropylene remain intact and the lobes initially composed of polyethylene deform, coalesce and/or disappear, possibly becoming rounded as shown in FIG. 4. The resulting fibers have a multilobal portion and a rounded portion.

FIG. 2(a) illustrates a die plate arrangement for making the bicomponent nonwoven filaments. The die plate 80 may be connected to an extruder assembly via bolt openings 82 or other similar fastener openings. Higher and lower melting polymers may enter the die via separate passages (not shown) communicating with two separate extruders and may be extruded as bicomponent fibers through the spinnerette openings 88. The general technology for converting two polymer streams into bicomponent fibers having a side-by-side or sheath-core arrangement is known in the art, and will not be described in detail here.

Figure 2B:
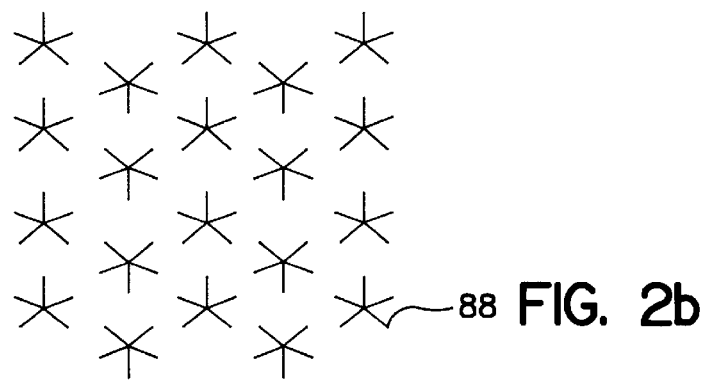
Figure 2C:
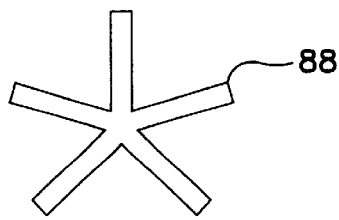

FIG. 2(b) is an enlarged view of the spinnerette openings 88 in die plate 80. FIG. 2(c) is a further enlarged view of a single spinnerette opening 88. As shown in FIG. 2(b), the spinnerette openings 88 are evenly spaced from each other and are arranged in a group, so that the bicomponent fibers may be extruded as a group or bundle. As shown in FIG. 2(c), each spinnerette opening has a pentalobal shape which conforms to the shape of the pentalobal bicomponent fiber being extruded.

The proportion of higher and lower melting polymers in the bicomponent fibers can range between about 10–90% by weight higher melting polymer and 10–90% lower melting polymer. In practice, only so much lower melting polymer is needed as will facilitate bonding between the fibers. Thus, a suitable fiber composition may contain about 40–80% by weight higher melting polymer and about 20–60% by weight lower melting polymer, desirably about 50–75% by weight higher melting polymer and about 25–50% by weight lower melting polymer.

A variety of polymers are suitable for the higher and lower melting polymer compounds of the bicomponent fibers. The most suitable polymers will vary depending on the end use filter applications, the methods used to bond the fibers together, the precise fiber shapes and sizes, and other factors. Generally, the lower melting polymer component may be a polyolefin homopolymer or copolymer. Examples include polyethylene (e.g., low density polyethylene or linear low density polyethylene), propylene-ethylene copolymers having about 10% by weight or more ethylene, other propylene-alpha olefin copolymers having sufficient comonomer content to impart at least some tackiness, syndiotactic polypropylene, blends of atactic and isotactic polypropylene, polybutenes, polypentenes and the like. The higher melting component may be a higher melting polyolefin homopolymer or copolymer. Examples include high density polyethylene, isotactic polypropylene, propylene-ethylene copolymers containing less than 10% ethylene, and other propylene-alpha olefin copolymers having sufficiently low comonomer content so as not to significantly lower the melting point. Other examples of higher melting components include polyamides, polyesters, polystyrenes, polytetrafluoroethylenes, polyvinyl chlorides, polyurethanes and the like. The higher and lower melting polymers can also be suitable blends which, in the case of the higher melting polymer impart structural integrity to the fibers, and in the case of the lower melting polymer exhibit suitable inter-fiber bonding properties. The higher and lower melting polymers should have a melting point difference of at least 5° C., suitably at least 10° C., desirably at least 30° C.

The multilobal fibers may be used either alone or in combination with other (e.g., single lobal, round) fibers in the nonwoven web used to form the filter. The other fibers may be monocomponent or bicomponent. Whether alone or in combination with other fibers, the multilobal fibers enhance the filtration efficiency by trapping, capturing or ensnaring particulate matter in the depressed regions between the lobes. To this end, the degree of improvement in filtration efficiency will vary depending on the percentage of multilobal fibers employed, with high levels giving the best performance. The invention contemplates the use of a nonwoven web containing anywhere from 1–100% by weight multilobal bicomponent fibers, having depressed regions between the lobes. Suitably, the nonwoven web will contain between 20–95% by weight multilobal fibers, desirably 40–90% by weight multilobal fibers, more desirably 50–85% by weight multilobal fibers. One way of combining the fibers is to extrude a layer of monolobal fibers over a layer of multilobal fibers, or vice versa.

The nonwoven web used as the filter medium (i.e., the multilobal fibers and other fibers, if any) may be a spunbond web, meltblown web, bonded carded web, air laid web, or a laminate including more than one nonwoven web layer. It is desired that the nonwoven web have high loft and low pressure drop across it during filtration. To this end, the nonwoven web is suitably a spunbond web. The nonwoven fibers may be crimped, in order to facilitate both higher loft and better entrapment of particles. The nonwoven web used as the filter medium should have a bulk density of about 0.01–0.1 grams/cm$^3$, suitably about 0.015–0.075 grams/cm$^3$, desirably about 0.02–0.05 grams/cm$^3$. The overall basis weight of the nonwoven web (or combination of webs) used as the filter medium may range from about 10–500 grams per square meter (gsm), suitably about 20–400 gsm, desirably about 30–300 gsm. The individual fibers (including multilobal fibers and round fibers, if present) may have a fiber denier of about 0.5–10, suitably about 1.5–6, desirably about 2–3.

In order to increase the attraction between particles being filtered and the filter fibers, the multilobal bicomponent fibers may be electret treated (electrecized). The electret treatment can be accomplished using conventional techniques by sequentially subjecting the nonwoven web to a series of electric fields, so that adjacent electric fields have substantially opposite polarities with respect to each other. For example, a first side of the web is initially subjected to a positive charge while a second side of the web is subjected to a negative charge. Then, the first side of the web is subjected to a negative charge and the second side is subjected to a positive charge, imparting permanent electrostatic charges in the web.

Figure 3:
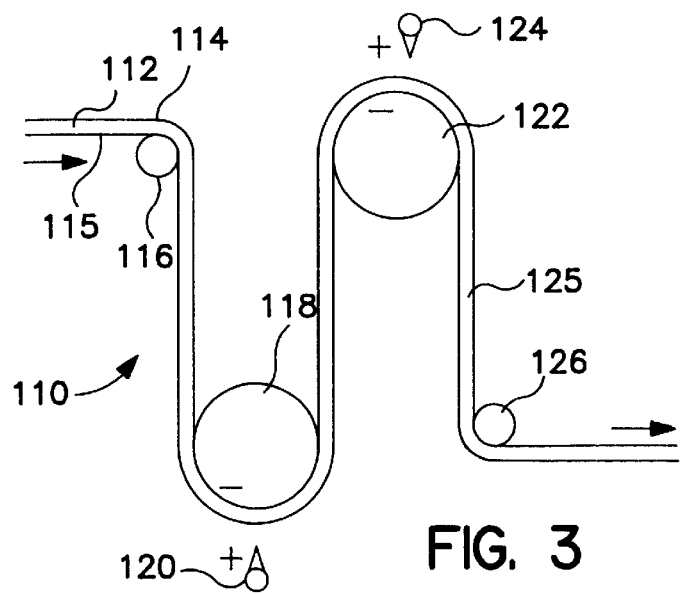
FIG. 3 schematically illustrates an apparatus for electret treating of a nonwoven web.

An apparatus for electrecizing the nonwoven web is illustrated in FIG. 3. An electrecizing apparatus 110 receives a nonwoven web 112 having a first side 114 and a second side 115. The web 112 passes into the apparatus 110 with the second side 115 in contact with guiding roller 116. Then the first side 114 of the web comes in contact with a first charging drum 118 which rotates with the web 112 and brings the web 112 into a position between the first charging drum 118 having a negative electrical potential and a first charging electrode 120 having a positive electrical potential. As the web 112 passes between the charging electrode 120 and the charging drum 118, electrostatic charges are developed in the web 112. A relative positive charge is developed in the first side and a relative negative charge is developed in the second side. The web 112 is then passed between a negatively charged second drum 122 and a positively charged second electrode 124, reversing the polarities of the electrostatic charge previously imparted in the web and permanently imparting the newly developed electrostatic charge in the web. The electrecized web 125 is then passed on to another guiding roller 126 and removed from the electrecizing apparatus 110. It is to be noted that for discussion purposes, the charging drums are illustrated to have negative electrical potentials and the charging electrodes are illustrated to have positive electrical potentials. However, the polarities of the drums and the electrodes can be reversed and the negative potential can be replaced with ground. In accordance with the present invention, the charging potentials useful for electrecizing processes may vary with the field geometry of the electrecizing process. For example, the electric fields for the above-described electrecizing process can be effectively operated between about 1 KVDC/cm and about 30 KVDC/cm, desirably between about 4 KVDC/cm and about 20 KVDC/cm, when the gap between the drum and the electrodes is between about 1.2 cm and about 5 cm. The above-described suitable electrecizing process is further disclosed in above-mentioned U.S. Pat. No. 5,401,446, which in its entirety is herein incorporated by reference.

Electret charge stability can be further enhanced by grafting polar end groups (maleic anhydride, polyacrylic acids, and the like) onto the polymers in the bicomponent fibers. Also, barium titanate and other polar materials can be blended with the polymers. Suitable blends are described, for instance, in PCT Publication WO 97/44509 to Turkevich et al., and in PCT Publication WO 00/00267 to Myers et al.

TEST PROCEDURES AND EXAMPLES

Ashrae 52.2–1999: Method of Testing General Ventilation Air Cleaning Devices for Removal Efficiency by Particle Size This test, which is a filter industry standard test has a standard procedure which is incorporated by reference. In summary, the test measures the efficiency of a filter medium in removing particles of specific diameter as the filter becomes loaded with standardized loading dust. The loading dust is fed at interval stages to simulate accumulation of particles during service life. The challenge aerosol for filtration efficiency testing is solid-phase potassium chloride (KCl) generated from an aqueous solution. An aerosol generator products KCl particles in twelve size ranges for filtration efficiency determination. The minimum efficiency observed over the loading sequence for each particle size range is used to calculate composite average efficiency values for three particle size ranges: 0.3 to 1.0 micron, 1.0 to 3.0 microns, and 3.0 to 10 microns.

The loading dust used to simulate particle accumulation in service is composed, by weight, of 72% SAE Standard J726 test dust (fine), 23% powdered carbon, and 5% milled cotton linters. The efficiency of clean filler medium is measured at one of the flow rates specified in the standard. A feeding apparatus then sends a flow of dust particles to load the filter medium to various pressure rise intervals until the specified final resistance is achieved. The efficiency of the filter to capture KCl particles is determined after each loading step. The efficiency of the filter medium is determined by measuring the particle size distribution and number of particles in the air stream, at positions upstream and downstream of the filter medium. The particle size removal efficiency ("PSE") is defined as:

$$PSE = 100 \times \left[1 - \left(\frac{\text{downstream particle count}}{\text{upstream particle count}}\right)\right]$$

The particle counts and size can be measured using a HIAC/ROYCO Model 8000 automatic particle counter and a HIAC/ROYCO Model 1230 sensor.

Ansi/Ashrae 52.1–1992: Gravimetric and Dust-Spot Procedures for Testing Air-Cleaning Devices Used in General Ventilation for Removing Particulate Matter This test is also a filter industry standard test, and has a detailed procedure which is incorporated by reference. In summary, the test measures the efficiency of filter medium in removing dust as the filter becomes loaded with a standard, synthetic dust. The dust removal performance is measured in two ways:

1. ASHRAE weight arrestance, measuring the weight percentage of the synthetic dust captured by the filtering medium.

2. ASHRAE dust-spot efficiency, comparing the blackening of targets upstream and downstream of the filtering medium when exposed to ambient atmospheric dust.

The dust-spot efficiency of clean filter medium is determined at a specified flow rate. A feeding apparatus then sends a flow of synthetic dust particles to load the filter medium at various pressure rise intervals until the specified final resistance is achieved. The arrestance and dust-spot efficiency are measured after each loading stage. When the final resistance is reached, the average arrestance, average dust-spot, and dust-holding capacity are calculated. The dust-holding capacity is the total weight of the dust increments multiplied by the average arrestance. The loading dust used to simulate particle accumulation in service is composed, by weight, of 72% SAE Standard J726 test dust (fine), 23% powdered carbon, and 5% milled cotton linters. This same synthetic dust is also used in ASHRAE 52.2 testing.

Example 1 (Comparative)

A 24-inch×24-inch×2-inch high capacity pleat filter was produced from a low density through-air bonded bicomponent spunbond web containing round fibers, and having a basis weight of 2.0 ounces per square yard (osy). The bicomponent fibers contained 50% by weight linear low density polyethylene and 50% by weight isotactic polypropylene, in a side-by-side configuration. The filtration efficiencies were measured using the above test procedure, for particles in the 0.3–1.0 micron range ("E1"), particles in the 1.0–3.0 micron range ("E2"), and particles in the 3.0–10.0 micron range ("E3"). The composite average efficiencies observed were:

E1 = 19.1%
E2 = 42.3%
E3 = 61.3%

Example 2

A filter similar to that of Example 1 was produced from an otherwise similar through-air bonded bicomponent web containing pentalobal fibers similar to those illustrated in FIG. 1(f). Again, the bicomponent fibers contained 50% by weight linear low density polyethylene and 50% by weight isotactic polypropylene, arranged side-by-side as shown in FIG. 1(f). The filtration efficiencies were measured, and compared with the results from Example 1. Table 1 shows the comparison.

TABLE 1

Filtration Efficiencies

| Particle Size Range | Composite Average Efficiency, % | | |
|---|---|---|---|
| | 2.0 osy Web, Round Fibers | 2.0 osy Web, Pentalobal Fibers | % Increase |
| E1 | 19.1 | 25.7 | 35 |
| E2 | 47.3 | 57.1 | 21 |
| E3 | 61.3 | 70.8 | 15 |

The increase in filtration efficiency was greatest for the smaller particles, suggesting that the depressions between the lobes can catch the smaller particles more easily. Also, the lobes provide more surface area for particle capture and attraction.

Examples 3 and 4

Filters similar to those of Examples 1 and 2 were produced. The filter of Example 3 contained a spunbond nonwoven web having round bicomponent fibers similar to Example 1. The only difference was that the nonwoven web used in Example 3 had a higher basis weight of 2.5 osy. The filter of Example 4 contained a spunbond web having pentalobal bicomponent fibers similar to Example 2. The only difference was that the nonwoven web used in Example 4 had a higher basis weight of 2.5 osy. The filters were tested for filtration efficiencies. The results are compared in Table 2.

TABLE 2

Filtration Efficiencies

| Particle Size Range | Composite Average Efficiency, % | | |
|---|---|---|---|
| | 2.5 osy Web, Round Fibers | 2.5 osy Web, Pentalobal Fibers | % Increase |
| E1 | 25.5 | 30.5 | 20 |
| E2 | 58.4 | 64.7 | 11 |
| E3 | 75.8 | 81.1 | 7 |

As shown above, the increases in filtration efficiencies were somewhat smaller for the 2.5 osy basis weight webs than for the 2.0 osy basis weight webs. This is because the higher basis weight webs are already more efficient, leaving less room for improvement. Interestingly, the 2.0 osy basis weight web made from pentalobal fibers (Table 1) had filtration efficiencies similar to the 2.5 osy basis weight web made from round fibers (Table 2). Thus, at comparable efficiencies, about a 20% material savings can be realized by constructing the filtration web from pentalobal fibers instead of round fibers.

Examples 5 and 6

For Example 5 (Comparative) a composite nonwoven web was prepared by extruding two outer layers of round bicomponent spunbond fibers and an inner layer of meltblown fibers, and combining the layers into a unitary structure using a through-air bonding process. The bicomponent spunbond fibers contained 50% by weight isotactic polypropylene and 50% by weight linear low density polyethylene, extruded in a side-by-side configuration. The meltblown fibers contained 100% isotactic polypropylene. The composite nonwoven web had a basis weight of 4.5 osy, with each of the spunbond constituents contributing 45% of the weight, and the meltblown constituent contributing 10% of the weight.

For Example 6, a composite nonwoven web similar to that of Example 5 was prepared, except that the second bicomponent spunbond layer contained pentalobal fibers as shown in FIG. 1(f), instead of round fibers.

The composite webs of Examples 5 and 6 were made into filter bags, with each bag having dimensions of 24 in. long, 24 in. wide, and 26 in. high. The composite webs were oriented so that the second bicomponent layer (e.g., the pentalobal fibers in Example 6) faced the inside of the bag, which was then exposed to an air stream. The bags were evaluated for dust holding capacity achieved before the pressure drop across the filter reached 1.0 in. gauge of water, using the ASHRAE 52.1-1992 test described above.

The filter bag made from the composite web of Example 5 had a dust holding capacity of 139 grams using this test. The filter bag made from the composite web of Example 6 had a dust holding capacity of 221 grams representing a 59% increase.

While the embodiments disclosed herein are presently preferred, various modifications and improvements can be made without departing from the spirit and scope of the invention. The scope of the invention is indicated by the appended claims, and all changes that fall within the meaning and range of equivalents are intended to be embraced therein.

I claim:

1. A nonwoven web, comprising:
   a plurality of side-by-side bicomponent multilobal fibers including a higher melting polymer component on a first side, a lower melting polymer component on a second side, an interface between the higher and lower melting polymer components, and a fiber denier of 0.5–10;
   each of the multilobal fibers including a raised lobal region on the first side and a rounded region on the second side, the raised lobal region including at least one pair of raised lobes and a depressed region between each pair of raised lobes, the rounded region being depressed relative to the raised lobes;
   wherein each raised lobe consists of a radially projecting portion; and
   a plurality of round fibers having a fiber denier of 0.5–10.

2. The nonwoven web of claim 1, wherein the higher melting component is selected from the group consisting of high density polyethylene, polypropylene, propylene-ethylene copolymers containing less than 10% ethylene, and combinations thereof, and the lower melting component is selected from the group consisting of low density polyethylene, linear low density polyethylene, propylene-ethylene copolymers having 10% or more ethylene, and combinations thereof.

3. The nonwoven web of claim 1, wherein the higher melting component comprises polypropylene and the lower melting component comprises polyethylene.

4. The nonwoven web of claim 1, wherein the rounded region comprises one or more rounded lobes region is formed by heating the lower melting component.

5. The nonwoven web of claim 1, wherein the multilobal fibers comprise pentalobal fibers.

6. The nonwoven web of claim 1, wherein the multilobal fibers comprise about 10–90% by weight of the higher melting polymer component and about 10–90% by weight of the lower melting polymer component.

7. The nonwoven web of claim 1, wherein the multilobal fibers comprise about 40–80% by weight of the higher melting polymer component and about 20–60% by weight of the lower melting polymer component.

8. The nonwoven web of claim 1, wherein the multilobal fibers comprise about 50–75% by weight of the higher melting polymer component and about 25–50% by weight of the lower melting polymer component.

9. A filter comprising the nonwoven web of claim 1.

10. A nonwoven web, comprising:
    a plurality of side-by-side bicomponent pentalobal fibers including a higher melting polymer component on a first side, a lower melting polymer component on a second side, an interface between the higher and lower melting polymer components and a fiber denier of 0.5–10;
    each of the pentalobal fibers including a plurality of radially projecting lobes on the first side and a rounded region on the second side, the rounded region including one or more lobes depressed relative to the lobes on the first side and comprising the lower melting component; and
    a plurality of round fibers having a fiber denier of 0.5–10.

11. The nonwoven web of claim 10, wherein the higher melting component comprises polypropylene and the lower melting component comprises polyethylene.

12. The nonwoven web of claim 10, wherein the multilobal fibers comprise about 10–90% by weight of the higher melting polymer component and about 10–90% by weight of the lower melting polymer component.

13. The nonwoven web of claim 10, wherein the multilobal fibers comprise about 40–80% by weight of the higher melting polymer component and about 20–60% by weight of the lower melting polymer component.

14. The nonwoven web of claim 10, wherein the multilobal fibers comprise about 50–75% by weight of the higher melting polymer component and about 25–50% by weight of the lower melting polymer component.

15. The nonwoven web of claim 10, wherein the multilobal fibers are electrecized.

16. A filter comprising the nonwoven web of claim 10.

17. A nonwoven web, comprising:
    a plurality of side-by-side bicomponent multilobal fibers including a higher melting polymer component on a first side, a lower melting polymer component on a second side, an interface between the higher and lower melting polymer components and a fiber denier of 0.5–10;
    each of the multilobal fibers including a plurality of raised lobes on the first side and one or more rounded lobes on the second side depressed relative to the raised lobes;
    wherein each raised lobe includes a proximal end and a distal end which is no wider than the proximal end; and
    a plurality of round fibers having a fiber denier of 0.5–10.

18. The nonwoven web of claim 17, wherein the higher melting component comprises polypropylene and the lower melting component comprises polyethylene.

19. A filter comprising the nonwoven web of claim 17.

* * * * *